United States Patent
Kalgaonkar et al.

(10) Patent No.: US 12,545,831 B2
(45) Date of Patent: Feb. 10, 2026

(54) METHOD AND COMPOSITIONS FOR STIMULATING SUBTERRANEAN FORMATIONS

(71) Applicants: Saudi Arabian Oil Company, Dhahran (SA); King Fahd University of Petroleum & Minerals, Dhahran (SA)

(72) Inventors: Rajendra Arunkumar Kalgaonkar, Dhahran (SA); Amro Othman, Al Khobar (SA); Murtada Saleh Aljawad, Dhahran (SA); Muhammed Shahzad Kamal, Dhahran (SA); Mohamed Mahmoud, Dhahran (SA); Qasim Sahu, Muntazah (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 18/734,012

(22) Filed: Jun. 5, 2024

(65) Prior Publication Data
US 2025/0376617 A1 Dec. 11, 2025

(51) Int. Cl.
C09K 8/68 (2006.01)
(52) U.S. Cl.
CPC .................................. C09K 8/685 (2013.01)
(58) Field of Classification Search
CPC ......................................................... C09K 8/685
See application file for complete search history.

(56) References Cited

U.S. PATENT DOCUMENTS

| | | | |
|---|---|---|---|
| 9,745,509 B2 | 8/2017 | Nasr-El-Din et al. | |
| 10,066,148 B2 | 9/2018 | Luyster et al. | |
| 10,995,257 B2 | 5/2021 | De Wolf et al. | |
| 11,466,200 B2 | 10/2022 | Beuterbaugh et al. | |
| 2013/0213657 A1 | 8/2013 | Dobson, Jr. et al. | |
| 2013/0303412 A1* | 11/2013 | Luyster .................. | C09K 8/86 507/236 |
| 2014/0124205 A1 | 5/2014 | Nasr-El-Din et al. | |

(Continued)

FOREIGN PATENT DOCUMENTS

EP 3101086 A1 12/2016

OTHER PUBLICATIONS

Almubarak, Tariq et al.; "Design and Application of High-Temperature Raw-Seawater-Based Fracturing Fluids" SPE 195597, Offshore Technology Conference Asia, Kuala Lumpur Mar. 22-25, 2016; pp. 1929-1946.

(Continued)

*Primary Examiner* — Crystal J Lee
(74) *Attorney, Agent, or Firm* — Bracewell LLP; Constance G. Rhebergen; Eleanor T. Porter

(57) ABSTRACT

A composition for use in well stimulation operations, the composition comprising a saline fluid, the saline fluid comprising between 50,000 ppm and 70,000 ppm total dissolved solids; a polymer, the polymer operable to react with a crosslinker to increase a viscosity of the saline fluid; a zirconium-containing crosslinker, the zirconium-containing crosslinker operable to react with the polymer, and a chelating agent, the chelating agent comprises diethylenetriaminepentaacetic acid (DTPA), wherein the DTPA is present in an amount between 0.1 wt. % and 0.4 wt. %.

13 Claims, 2 Drawing Sheets

(56) References Cited

U.S. PATENT DOCUMENTS

2015/0141302 A1    5/2015    Nasr-El-Din et al.
2018/0258342 A1*  9/2018    Nguyen ................. C09K 8/887

OTHER PUBLICATIONS

Almubarak, Tariq et al.; "Zirconium Crosslinkers: Understanding Performance Variations in Crosslinked Fracturing Fluids" OTC-30381-MS, Offshore Technology Conference Asia, Nov. 2-6, 2020; pp. 1-24.

Elsarawy, Ahmed et al.; "Compatibility and Rheology of High-pH Borate Gels Prepared with Produced Water for Hydraulic-Fracturing Applications" SPE 185953, 2017 SPE Production & Operations; pp. 1-17.

Harris, Phillip C. et al.; "A Comparison of Freshwater—and Seawater-Based Borate-Crosslinked Fracturing Fluids" SPE 50777, International Symposium on Oilfield Chemistry, Houston, TX, Feb. 16-19, 1999, pp. 1-5.

Li, Leiming et al.; "A review of crosslinked fracturing fluids prepared with produced water" Petroleum 2 (2016); pp. 313-323.

Prakash, Chetan et al.; "Hydraulic Fracturing Application on New Seawater-Based Clean Fluid" SPE-183024-MS, International Petroleum Exhibition & Conference, Abu Dhabi, UAE, Nov. 7-10, 2016; pp. 1-20.

Satya Gupta, D.V. et al.; "Novel Chelation Opens the Door for Redeployment of Sea Water Based Fracturing Fluids in High Temperature Wells" SPE-189543-MS, SPE Int'l Conf. and Exhibition on Formation Damage Control, Lafayette, LA, Feb. 7-9, 2018; pp. 1-13.

Sun, Xin et al.; "Development and evaluation of a novel seawater-based viscoelastic fracturing fluid system" Journal of Petroleum Science and Engineering 183 (2019) 106408; pp. 1-10.

\* cited by examiner

METHOD AND COMPOSITIONS FOR STIMULATING SUBTERRANEAN FORMATIONS

TECHNICAL FIELD

Disclosed are compositions and methods for hydraulic fracturing treatments. Specifically, disclosed are compositions and methods for hydraulic fracturing treatments using high salinity waters.

BACKGROUND

The huge consumption of costly and scarce freshwater in hydraulic fracturing motivated research towards utilizing seawater (SW) and produced water (PW). These water sources have high salinity, affecting viscosity and stability in harsh conditions. Both divalent ions ($Ca^{2+}$, $Mg^{2+}$) and monovalent ions ($Na^+$, $K^+$) ions are associated with the seawater and produced water, affecting the fracturing fluid rheology. While the main source of precipitations and viscosity reduction is the divalent ions; in their absence, monovalent ions can reduce viscosity. In high pH environments, which is required to crosslink some crosslinkers, the divalent ions ($Ca^{2+}$, $Mg^{2+}$) in saline systems tend to form hydroxide precipitation and produce scales. These hydroxides lower the pH and reduce the fracturing fluids' viscosity. The high concentration of divalent ions, ($Ca^{2+}$, $Mg^{2+}$) in seawater and produced water decreases the viscosity and more polymer precipitates as the ions affect polymer hydration. The divalent ions can also affect the gel breakers and pH control additives. The scale formation and precipitation decrease the fracture conductivity, and corrosion issues may occur. Also, the saline water-associated ions can induce thermal stability issues.

SUMMARY

Disclosed are compositions and methods for hydraulic fracturing treatments. Specifically, disclosed are compositions and methods for hydraulic fracturing treatments using high salinity waters.

In a first aspect, a composition for use in well stimulation operations is provided. The composition includes a saline fluid, the saline fluid includes between 50,000 ppm and 70,000 ppm total dissolved solids, a polymer, the polymer operable to react with a crosslinker to increase a viscosity of the saline fluid, a zirconium-containing crosslinker, the zirconium-containing crosslinker operable to react with the polymer, and a chelating agent, the chelating agent includes diethylenetriaminepentaacetic acid (DTPA), where the DTPA is present in an amount between 0.1 wt % and 0.4 wt %.

In certain aspects, the saline fluid can be selected from the group consisting of seawater, produced water, and combinations of the same. In certain aspects, the polymer includes carboxymethyl hydroxypropyl guar (CMHPG) polymer. In certain aspects, the polymer is present in an amount between 0.5 wt % and 0.6 wt %. In certain aspects, the zirconium-containing crosslinker is selected from the group consisting of a zirconium crosslinker and a zirconium borate dual crosslinker. In certain aspects, the zirconium-containing crosslinker is present in an amount of 1 wt %. In certain aspects, the chelating agent is present in an amount between 0.1 wt % and 0.4 wt %. In certain aspects, the composition has a viscosity in the range between 100 cP and 1000 cP. In certain aspects, the zirconium-containing crosslinker is the zirconium crosslinker and the viscosity is between 100 cP and 250 cP. In certain aspects, the zirconium-containing crosslinker is the zirconium borate dual crosslinker and the viscosity is between 850 cP and 950 cP.

In a second aspect, a method of using a hydraulic fracturing fluid is provided. The method includes the step of injecting the hydraulic fracturing fluid into a formation during a well stimulation operation. The hydraulic fracturing fluid includes a saline fluid, the saline fluid includes between 50,000 ppm and 70,000 ppm total dissolved solids, a polymer, the polymer operable to react with a crosslinker to increase a viscosity of the saline fluid, a zirconium-containing crosslinker, the zirconium-containing crosslinker operable to react with the polymer, and a chelating agent, the chelating agent includes diethylenetriaminepentaacetic acid (DTPA), where the DTPA is present in an amount between 0.1 wt % and 0.4 wt %.

In certain aspects, the well stimulation operations are selected from the group consisting of fracturing and proppant transport.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
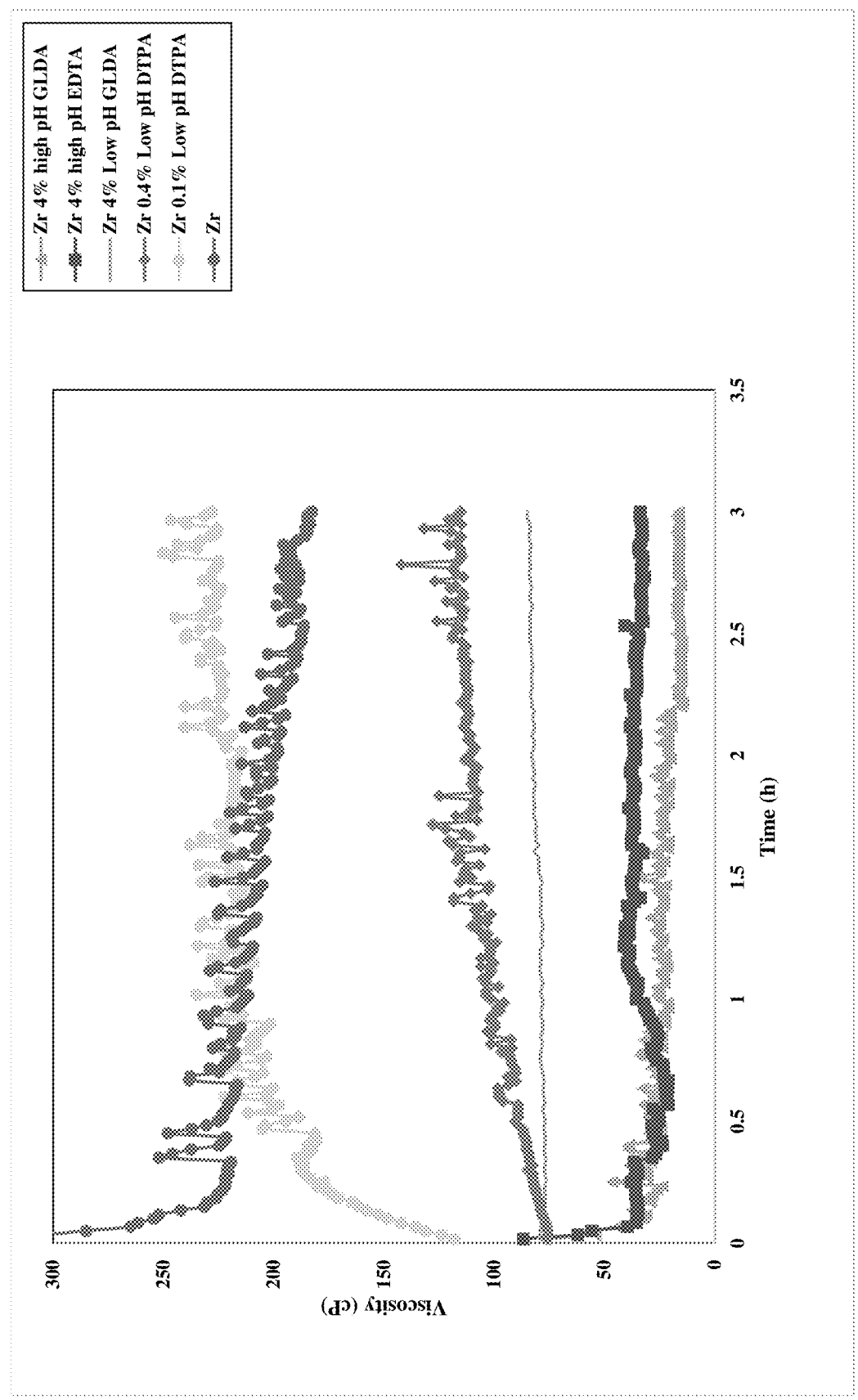
FIG. 1 is a graph depicting viscosity over time for mixtures of 0.6 wt. % CMHPG polymer with 1 wt. % zirconium crosslinker and different chelating agents in a pressure cell at 70° C., 100 l/s ($s^{-1}$), and 500 psi (3447.4 kPa).

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The composition and methods allow for the use of high salinity waters in fracturing fluid treatments. Advantageously, the compositions alleviate the necessity for using freshwater or low salinity waters in hydraulic fracturing treatments.

As used throughout, "high salinity" means a fluid having a total dissolved solids greater than 50,000 ppm.

The hydraulic fracturing fluid includes a saline fluid, a polymer, a zirconium-containing crosslinker, and a chelating agent.

The saline fluid be any high salinity water. The saline fluid can include seawater, produced water, and combinations of the same. The saline fluid can have a total dissolved solids of greater 50,000 ppm, alternately between 50,000 ppm and 70.00 ppm, alternately 67,700 ppm.

The polymer acts as a gelling agent reacting with the crosslinker to create a gel that increases the viscosity of the saline fluid. The polymer can be a carboxymethyl hydroxypropyl guar (CMHPG) polymer. The CMHPG polymer can be present in amount between 0.5 wt % and 0.6 wt %, and alternately in an amount of 0.6 wt %. The amount of CMHPG can be controlled by field application standards not to exceed 50 pounds per thousand gallons (pptg) (5.99 kg/m$^3$).

The zirconium-containing crosslinker reacts with the polymer to create a gel that increases the viscosity of the saline fluid. The zirconium-containing crosslinker includes a zirconium crosslinker, a zirconium borate dual crosslinker, and combinations of the same. The zirconium-containing crosslinker can be present in an amount of 1 wt %. The amount of zirconium-containing crosslinker is selected to achieve the desired viscosity.

Chelating agents can improve the viscosification effect besides polymers and crosslinkers. The chelating agent can be diethylenetriaminepentaacetic acid (DTPA). The chelating agent can be present in an amount between 0.1 wt % and 0.4 wt %. At amounts of DTPA greater than 0.4 wt % the desired viscosity was not achieved. Advantageously, the DTPA softens the saline water and captures the ions preventing salt precipitation. Advantageously, DTPA can eliminate scale from BaSO$_4$ and SrSO$_4$. Advantageously, DTPA has superior stability constant and a distinctive structural alignment on the scale's surface, which gives it a remarkable ability to remove scales. Advantageously, DTPA has reduced corrosiveness and generates metal chelate without producing hazardous gas compared to other scale removal solutions. Advantageously, the DTPA creates a hydraulic fracturing fluid with a stable viscosity. The DTPA does not increase the viscosity compared to a composition without a chelating agent.

In at least one embodiment, the hydraulic fracturing fluid includes seawater, CMHPG polymer, a zirconium crosslinker, and a DTPA chelating agent. In at least one embodiment, the hydraulic fracturing fluid includes seawater, CMHPG polymer, a zirconium borate dual crosslinker, and a DTPA chelating agent. The results show that fluids can be formulated using sea water, CMHPG polymer, zirconium-containing crosslinkers, and DTPA chelating agents that exhibit viscosities suitable for use in hydraulic fracturing treatments. Advantageously the hydraulic fracturing fluids described herein address issues with high salinity fluids such as precipitation and ion capture.

The hydraulic fracturing fluids have viscosity between 100 cP and 1000 cP, alternately between 100 cP and 900 cP. In at least one embodiment, the zirconium-containing crosslinker is the zirconium crosslinker the viscosity can be between 100 cP and 250 cP. In at least one embodiment, the zirconium-containing crosslinker is the zirconium borate dual crosslinker the viscosity can be between 850 cP and 1000, alternately 850 cP and 950 cP, and alternately 900 cP.

The hydraulic fracturing fluid can include a proppant. Any proppant suitable for use in a hydraulic fracturing fluid can be used.

The hydraulic fracturing fluid can be used for well stimulation operations, including fracturing and proppant transport. Advantageously, the hydraulic fracturing fluid prevents or reduces formation damage by preventing scales and precipitated ions.

The hydraulic fracturing fluid is in the absence of ethylenediaminetetraacetic acid (EDTA), tetrasodium glutamate diacetate (GLDA), polyvinyl alcohol. The hydraulic fracturing fluids are in the absence of emulsions. The hydraulic fracturing fluid is in the absence of an emulsion. The hydraulic fracturing fluid is in the absence of a foam.

Examples

Experiments to produce hydraulic fracturing fluid compositions were performed. The experiments studied different concentrations of chelating agent in a seawater system. The CMHPG polymer was XLFC-3B obtained from Baker Hughes Inc. Houston, TX. The zirconium crosslinker was obtained from Taqa Company. The zirconium borate dual crosslinker was obtained from Mnchem. The different chelating agents included low pH GLDA, high pH GLDA, low pH EDTA, high pH EDTA, and low pH DTPA. The low and high pH GLDA of 40% active content was obtained from Nouryon. The high pH EDTA of 40% active content was obtained from Mnchem. The low pH DTPA of 4% active content was obtained from Mnchem. An Anton Paar-MCR 302 rheometer was used to acquire the viscosity results. The seawater contained the salt ions shown in Table 1 in grams per liter.

TABLE 1

| Associated ions in 1 liter of seawater. | |
|---|---|
| Ion | Weight Amount |
| $Mg^{2+}$ | 2.1098 |
| $Ca^{2+}$ | 0.6496 |
| $Na^+$ | 18.3017 |
| $Cl^-$ | 32.3278 |
| $SO_4^{2-}$ | 4.2864 |
| $HCO_{3-}$ | 0.1198 |

Experimental Design

In all experiments, 0.6 wt % CMHPG polymer was hydrated in the seawater for 45 minutes at 500 rpm. The volume of the prepared fluid was 21 mL. Then, different concentrations of the chelating agents were added to the prepared fluid and mixed for 5 minutes. In a next step, 1 wt % of the crosslinker based on total weight of solution was added to each solution and mixed for 5 minutes. Finally, the mixture was poured into a high-pressure cell in the rheometer with a shear rate of 100 1/s at 70° C. and 500 psi (3447.4 kPa). The high-pressure cell was operated for 3 hours for each experiment.

Results and Discussion

Zirconium Crosslinker

Mixtures were prepared according to the experimental designed described with the zirconium crosslinker and chelating agent concentrations of 4 wt % low pH GLDA, 4 wt % high pH GLDA 4 wt % high pH EDTA, 0.4 wt % low pH DTPA, and 0.1 wt % low pH DTPA. A control mixture was prepared that contained the zirconium crosslinker but did not include a chelating agent. The results of the high-pressure cell are shown in FIG. 1. Compared to the mixture containing only the zirconium crosslinker, only the mixture with 0.1 wt % low pH DTPA positively impacted the zirconium crosslinker in less than 1 hour. The remaining mixtures exhibited negative effects on the crosslinker with the higher the pH the lower the viscosity of the solution.

Zirconium Borate Crosslinker

Figure 2:
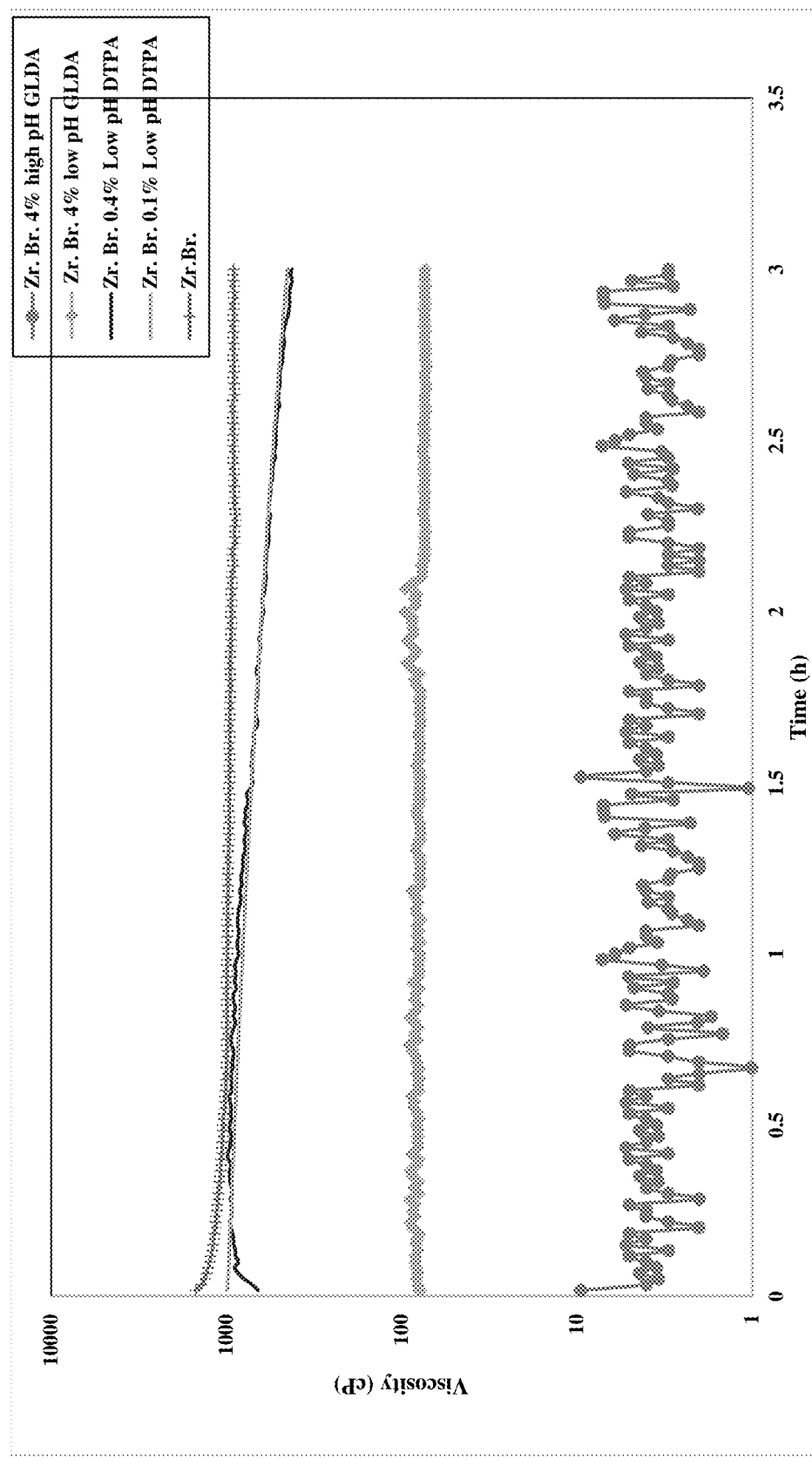
FIG. 2 is a graph depicting viscosity over time for mixtures of 0.6 wt. % CMHPG polymer with 1 wt. % zirconium borate dual crosslinker and different chelating agents in a pressure cell at 70° C., 100 l/s and 500 psi (3447.4 kPa).

Mixtures were prepared according to the experimental designed described with the zirconium borate dual crosslinker and chelating agent concentrations of 4 wt % low pH GLDA, 4 wt % high pH GLDA, 4 wt % high pH EDTA, 0.4 wt % low pH DTPA, 0.1 wt % low pH DTPA. A control mixture was prepared that contained the zirconium borate dual crosslinker but did not include a chelating agent. The results of the high pressure cell are shown in FIG. 2. The fluid with 0.1 wt % low pH DTPA and 0.4 wt % low pH DTPA exhibited viscosity values in a desirable range.

The results show that fluids can be formulated using sea water, CMHPG polymer, zirconium-containing crosslinkers, and DTPA chelating agents that exhibit viscosities suitable for use in hydraulic fracturing treatments.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

What is claimed is:

1. A composition for use in well stimulation operations, the composition comprising:
   a saline fluid, the saline fluid comprising between 50,000 ppm and 70,000 ppm total dissolved solids;
   a polymer, the polymer operable to react with a crosslinker to increase a viscosity of the saline fluid, wherein the polymer is present in an amount between 0.5 wt % and 0.6 wt %;
   a zirconium-containing crosslinker, the zirconium-containing crosslinker operable to react with the polymer, wherein the zirconium-containing crosslinker is present in an amount of 1 wt %; and
   a chelating agent, the chelating agent comprises diethylenetriaminepentaacetic acid (DTPA), wherein the DTPA is present in an amount between 0.1 wt % and 0.4 wt %, wherein the composition has a viscosity in the range between 100 cP and 1000 cP.

2. The composition of claim 1, wherein the saline fluid can be selected from the group consisting of seawater, produced water, and combinations of the same.

3. The composition of claim 1, wherein the polymer comprises carboxymethyl hydroxypropyl guar (CMHPG) polymer.

4. The composition of claim 1, wherein the zirconium-containing crosslinker is selected from the group consisting of a zirconium crosslinker and a zirconium borate dual crosslinker.

5. The composition of claim 4, wherein the zirconium-containing crosslinker is the zirconium crosslinker and the viscosity is between 100 cP and 250 cP.

6. The composition of claim 4, wherein the zirconium-containing crosslinker is the zirconium borate dual crosslinker and the viscosity is between 850 cP and 950 cP.

7. The composition of claim 1, further comprising a proppant.

8. A method of using a hydraulic fracturing fluid, the method comprising the step of:
   injecting the hydraulic fracturing fluid into a formation during a well stimulation operation, wherein the hydraulic fracturing fluid comprises:
   a saline fluid, the saline fluid comprising between 50,000 ppm and 70,000 ppm total dissolved solids;
   a polymer, the polymer operable to react with a crosslinker to increase a viscosity of the saline fluid, wherein the polymer is present in an amount between 0.5 wt % and 0.6 wt %;
   a zirconium-containing crosslinker, the zirconium-containing crosslinker operable to react with the polymer, wherein the zirconium-containing crosslinker is present in an amount of 1 wt %; and
   a chelating agent, the chelating agent comprises diethylenetriaminepentaacetic acid (DTPA), wherein the DTPA is present in an amount between 0.1 wt % and 0.4 wt %, wherein the hydraulic fracturing fluid has a viscosity in the range between 100 cP and 1000 cP.

9. The method of claim 8, wherein the well stimulation operation is selected from the group consisting of fracturing and proppant transport.

10. The method of claim 8, wherein the saline fluid can be selected from the group consisting of seawater, produced water, and combinations of the same.

11. The method of claim 8, wherein the polymer comprises carboxymethyl hydroxypropyl guar (CMHPG) polymer.

12. The method of claim 8, wherein the zirconium-containing crosslinker is selected from the group consisting of a zirconium crosslinker and a zirconium borate dual crosslinker.

13. The method of claim 8, wherein the hydraulic fracturing fluid further comprises a proppant.

* * * * *